(12) United States Patent
Jamieson (10) Patent No.: US 7,497,457 B2
(45) Date of Patent: Mar. 3, 2009

(54) TRAILER TOWING SYSTEM

(76) Inventor: Joseph P. Jamieson, American Automation Technologies, Inc., 1701 Gateway Blvd. Suite 403, Richardson, TX (US) 75080

( * ) Notice: Subject to any disclaimer, the term of this patent is extended or adjusted under 35 U.S.C. 154(b) by 375 days.

(21) Appl. No.: 11/249,100

(22) Filed: Oct. 12, 2005

(65) Prior Publication Data

US 2006/0076754 A1    Apr. 13, 2006

Related U.S. Application Data (60) Provisional application No. 60/617,836, filed on Oct. 12, 2004.

(51) Int. Cl.
*B60D 1/00* (2006.01)
(52) U.S. Cl. .................. 280/460.1; 280/441.2
(58) Field of Classification Search ............. 280/476.1, 280/460.1, 441.2, 503, 477; 180/53.6
See application file for complete search history.

(56) References Cited

U.S. PATENT DOCUMENTS

| | | | |
|---|---|---|---|
| 2,460,466 A | | 2/1949 | Nogle |
| 2,570,482 A | * | 10/1951 | Pruitt ................. 280/476.1 |
| 2,622,891 A | | 12/1952 | Knapp |
| 3,033,593 A | | 5/1962 | Zaha |
| 3,053,224 A | | 9/1962 | Pierce |
| 3,254,782 A | * | 6/1966 | Mold ................... 141/502 |
| 3,476,405 A | | 11/1969 | Cunha |
| 3,486,768 A | | 12/1969 | Masser |
| 3,797,863 A | | 3/1974 | Cunha |
| 3,837,677 A | * | 9/1974 | Haskins ............... 280/476.1 |
| 3,858,908 A | * | 1/1975 | Frank ................. 280/476.1 |
| 3,865,405 A | * | 2/1975 | Mitchell et al. ....... 280/476.1 |
| 3,870,340 A | | 3/1975 | Winter |
| 3,893,711 A | | 7/1975 | Goodwin |
| 3,930,670 A | | 1/1976 | Haskins |
| 3,995,876 A | | 12/1976 | Ronne |
| D249,667 S | | 9/1978 | Thompson |
| 4,365,820 A | | 12/1982 | Rush |
| D270,822 S | | 10/1983 | Triggs |
| 4,468,046 A | | 8/1984 | Rutherford |
| D287,113 S | | 12/1986 | FitzGerald |
| 4,856,804 A | * | 8/1989 | Nash .................... 280/430 |
| 4,955,629 A | | 9/1990 | Todd, Jr. et al. |
| D342,700 S | | 12/1993 | Vernese |
| 5,280,939 A | | 1/1994 | Kee et al. |

(Continued)

*Primary Examiner*—Tony H. Winner
(74) *Attorney, Agent, or Firm*—Colin P. Cahoon; Jeffrey G. Degenfelder; Carstens & Cahoon, LLP (57) ABSTRACT

An accessory towing apparatus that connects a towing vehicle to a gooseneck type trailer. The accessory towing apparatus includes a chassis assembly mounted on an axle having two ground engaging wheels. The chassis assembly includes two linkage arms, which are attached to and extend from the axle. The ends of the two linkage arms are designed to engage two brackets attached to the main frame of the towing vehicle. The linkage arms may further include a pivot point near the axle attachment point that permits the arms to pivot and spread away from one another in order to facilitate the engagement of the linkage arms in their respective brackets. A novel clamping lever system may also be utilized to secure the two linkage arms into their respective brackets. An automatic alignment and attachment system may also be included to greatly simplify the attachment process of the gooseneck type trailer to the towing vehicle.

20 Claims, 7 Drawing Sheets

U.S. PATENT DOCUMENTS

| | | |
|---|---|---|
| D344,473 S | 2/1994 | Romesburg |
| 5,382,041 A * | 1/1995 | Keith .................... 280/476.1 |
| D395,260 S | 6/1998 | Garzancich et al. |
| 5,860,668 A | 1/1999 | Hull et al. |
| 5,924,716 A | 7/1999 | Burkhart, Sr. et al. |
| 6,290,248 B1 | 9/2001 | Yrigoyen |
| 6,390,752 B1 | 5/2002 | Eiland |
| 6,565,108 B1 | 5/2003 | Gearhart |
| 6,640,528 B1 * | 11/2003 | Rowland .................... 56/15.2 |
| 6,663,131 B2 | 12/2003 | Evans |
| 6,733,028 B2 | 5/2004 | Teeple |
| 7,090,601 B2 * | 8/2006 | Schonnenbeck ............. 474/18 |
| 2002/0117831 A1 | 8/2002 | Ahlquist et al. |

* cited by examiner

TRAILER TOWING SYSTEM

CROSS-REFERENCE TO RELATED APPLICATION

This application claims the benefit of and priority to a U.S. Provisional Patent Application No. 60/617,836 filed Oct. 12, 2004, the technical disclosure of which is hereby incorporated herein by reference.

BACKGROUND OF THE INVENTION

1. Technical Field

The present invention relates to a trailer towing system and more particularly to an improved towing apparatus used to connect a towing vehicle and a gooseneck type trailer, whereby the improved towing apparatus enhances the utility, stability and safety of the hitched vehicle and trailer.

2. Description of the Related Art

Figure 1A:
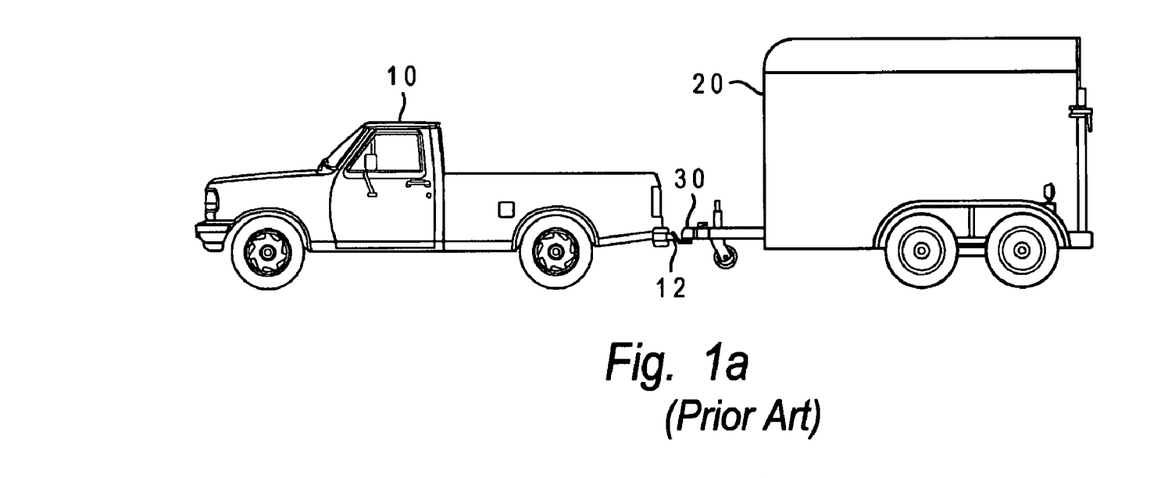
FIG. 1a is a side view of a prior art bumper hitch towing system.

As shown in FIG. 1a, a towing mechanism such as a simple bumper hitch 12 is frequently added to a vehicle 10 for the purpose of towing a trailer 20. However, such a bumper pull trailer can oftentimes place an excessive vertical load on the back end of the towing vehicle 10. Moreover, such draw bar trailers have inherent stability and weight transfer problems due to the towing pivot point being positioned behind the rear axle of the towing vehicle 10.

Figure 1B:
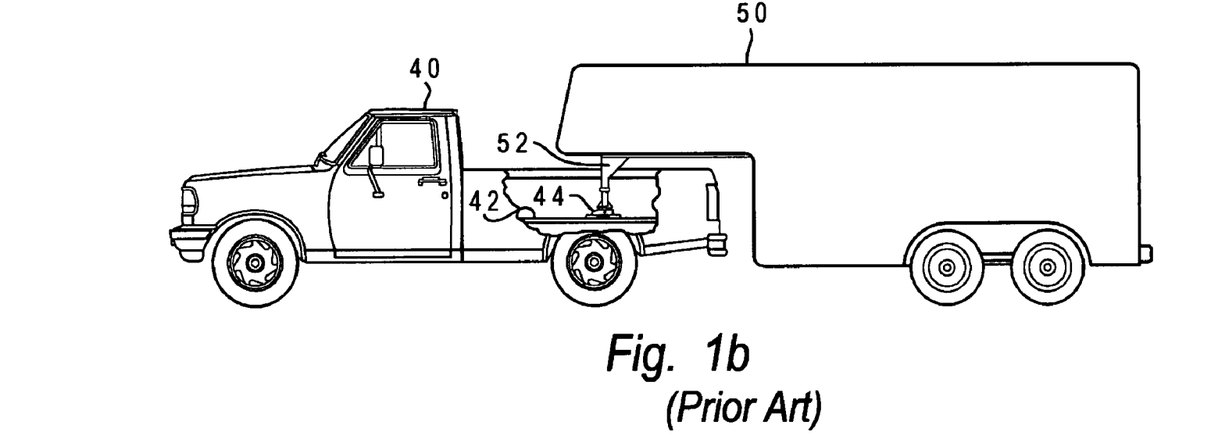
FIG. 1b is a side view of a prior art gooseneck type towing system.

A more recent innovation in trailer towing systems includes what are commonly referred to as gooseneck trailer rigs and fifth wheel recreational vehicle (RV) trailers (hereinafter referred to as "gooseneck type trailers"). As shown in FIG. 1b, gooseneck trailer rigs typically include a trailer 50 having an extended forward section with a vertical tongue 52 extending therefrom. The vertical tongue 52 is adapted to be coupled to a hitch mechanism 44, which is secured to and supported by a suitable frame mechanism attached to the bed 42 of a pick-up truck 40. The hitch mechanism 44 is typically mounted onto the bed of the truck above and slightly forward of its rear axle. A coupler mechanism, located at a distal end of the vertical tongue 52, pivotally attaches the vertical tongue 52 to a fixed ball portion of the hitch mechanism 44. Fifth wheel RV trailers are much the same as gooseneck trailers but have much shorter vertical tongues and typically require a raised hitch mechanism on the tow vehicle.

The gooseneck type trailer system offers a number of advantages over the bumper pulled or draw bar trailers. By virtue of its geometry, gooseneck type trailer rigs are typically able to safely tow greater loads than similarly sized bumper pulled trailers because the load is passed directly onto the rear axle of the truck instead of onto the bumper. Moreover, by positioning the pivot point of the trailer nearly over the rear axle, gooseneck type trailer rigs distribute the load more evenly over the tow vehicle, causing less wear and tear on the vehicle and a smoother ride. In addition, gooseneck type trailer rigs also offer a smaller turning radius.

While current gooseneck type trailer rigs offer improved stability over bumper pull trailers, they also have several disadvantages. In general, gooseneck type trailer rigs are only suitable for use with a pick-up truck style towing vehicle. Moreover, the storage capacity of the pick-up bed is greatly diminished while the gooseneck type rig is attached to the towing vehicle. In addition, when detached from the towing vehicle, supporting legs or jack stands must be extended to support the forward portion of the trailer rendering the gooseneck type trailer essentially immobile. The reattachment of the gooseneck type trailer to a towing vehicle can also be inordinately complex and difficult. What is needed is an improved trailer towing system which fully exploits the usefulness of the gooseneck type trailer while minimizing its inherent shortcomings.

Another problem area with all trailer towing systems involves braking. While four wheel brakes are mandatory for vehicles and combinations of vehicles over 10,001 lbs., many lighter trailers have no brakes. This is particularly critical with regard to gooseneck type trailers, which are typically larger. Without brakes, a trailer will push against the tow vehicle every time it decelerates to stop. Moreover, if there is a sway, the trailer can jackknife because there is nothing to control it. Thus, larger trailers are typically equipped with rudimentary braking systems. There are basically three types of trailer braking systems currently available: electronically controlled electric brakes, hydraulically controlled electric brakes, and surge hydraulic brakes. Electronically controlled electric brakes provides automatic and manual control of electric trailer brakes and require the towing vehicle to be equipped with controlling device and additional wiring for electrical power. Hydraulically controlled electric brakes are electric brakes which are applied in proportion to brake pedal pressure applied in the towing vehicle. Surge brakes are independent hydraulic brakes activated by a master cylinder at the junction of the hitch and trailer. Thus, current trailer braking systems are highly dependent upon the towing vehicle for either electrical power or hydraulic power. Therefore, a need exists for an improved trailer towing system having enhanced braking and stability capabilities. Moreover, it would be desirable to produce an improved trailer towing system having an independent trailer braking capability and providing enhanced stability to the both the trailer and the towing vehicle.

SUMMARY OF THE INVENTION

The present invention overcomes many of the disadvantages of prior art towing systems by allowing gooseneck type trailers to be towed by a variety of motor vehicles. Moreover, the present invention allows a gooseneck type trailer to be towed without diminishing the storage capacity of the towing vehicle. In addition, the present invention improves the stability and mobility of a gooseneck type trailer, both while attached to and detached from the towing vehicle. Furthermore, the present invention includes a novel apparatus and method that greatly simplifies the reattachment process of the gooseneck type trailer to the towing vehicle.

The improved system includes an accessory towing apparatus used to connect the towing vehicle and a gooseneck type trailer. The accessory towing apparatus effectively extends the towing vehicle's wheelbase thereby enhancing stability and control. Moreover, when properly secured the axle of the accessory towing apparatus is aligned parallel with the traction axle of the towing vehicle further enhancing the stability and control of the towing assembly. The accessory towing apparatus also prevents the overloading of the back end of the towing vehicle, which can induce poor steering and traction control and braking ability. Indeed, by absorbing the vertical load of the gooseneck type trailer, the accessory towing apparatus allows a smaller sized towing vehicle to be used safely.

In one embodiment, the accessory towing apparatus includes a chassis assembly mounted on an axle having two ground engaging wheels. The chassis assembly includes two linkage arms, which are attached to and extend from the axle. The ends of the two linkage arms are designed to engage two brackets attached to the main frame of the towing vehicle. When the linkage arms are engaged in their respective brackets, they are substantially parallel to one another.

In one embodiment, the linkage arms may further include a pivot point near the axle attachment point that permits the arms to pivot and spread away from one another in order to facilitate the engagement of the linkage arms in their respective brackets. A novel clamping lever system may also be utilized to secure the two linkage arms into their respective brackets. The clamping lever system comprises two opposing cantilever arms, which are each attached to their respective linkage arm, and a lever arm which connects the two cantilever arms.

In another embodiment, the accessory towing apparatus may further include an automatic alignment and attachment system. The alignment and attachment system comprises two lengths of cable or chain each attached to a separate ratcheting winch mechanism. The ratcheting winch mechanisms are preferably self-contained and integral to the accessory towing apparatus and may be powered and controlled mechanically, electrically, hydraulically or any combination thereof. The two chains or cables are of equal length and adequately spaced apart, such that when the cables are attached to a tow vehicle the centerline of the trailer may be aligned with the centerline of the tow vehicle by simply driving the tow vehicle straight forward. The ratcheting winch mechanism may then be used to hoist and guide the two linkage arms into their respective brackets. Moreover, when the trailer is positioned in a soggy area having poor traction, the towing vehicle can be positioned on solid footing and the cable and winch of the alignment and attachment system may be used to pull the accessory towing apparatus and trailer to the towing vehicle.

In accordance with another feature of the invention, the axle assembly may also include a power take off mechanism to power a hydraulic pump assembly, a vacuum pump assembly, and/or an accessory electrical generator. The independent hydraulic and vacuum pump assembly enables the accessory towing apparatus to provide hydraulic braking power to all trailer wheels that is independent of the towing vehicle's hydraulic braking system. In addition, the accessory hydraulic pump can be used to charge a hydraulic pressure accumulator thereby providing accessory hydraulic power for a hydraulic powered ratcheting winch mechanism. Likewise, the electrical generator enables the accessory towing apparatus to provide accessory electrical power to itself and the trailer that is independent of the towing vehicle's electrical system. Additionally, the accessory electrical generator can be used to charge an accessory battery on the accessory towing apparatus, which can supply emergency or back-up electrical power to the towing vehicle.

Thus, the accessory towing apparatus of the present invention offers a number of advantages over previous towing apparatus. The accessory towing apparatus effectively extends the towing vehicle's wheelbase thereby enhancing stability and control. Moreover, it eliminates the overloading of the back end of the towing vehicle that induces poor steering control and braking ability. Indeed, by absorbing the vertical load of the gooseneck type trailer, the accessory towing apparatus allows a smaller sized towing vehicle to be safely used. Furthermore, it adds an additional axle to aid in braking.

BRIEF DESCRIPTION OF THE DRAWINGS

A more complete understanding of the method and apparatus of the present invention may be had by reference to the following detailed description when taken in conjunction with the accompanying drawings, wherein.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 2:
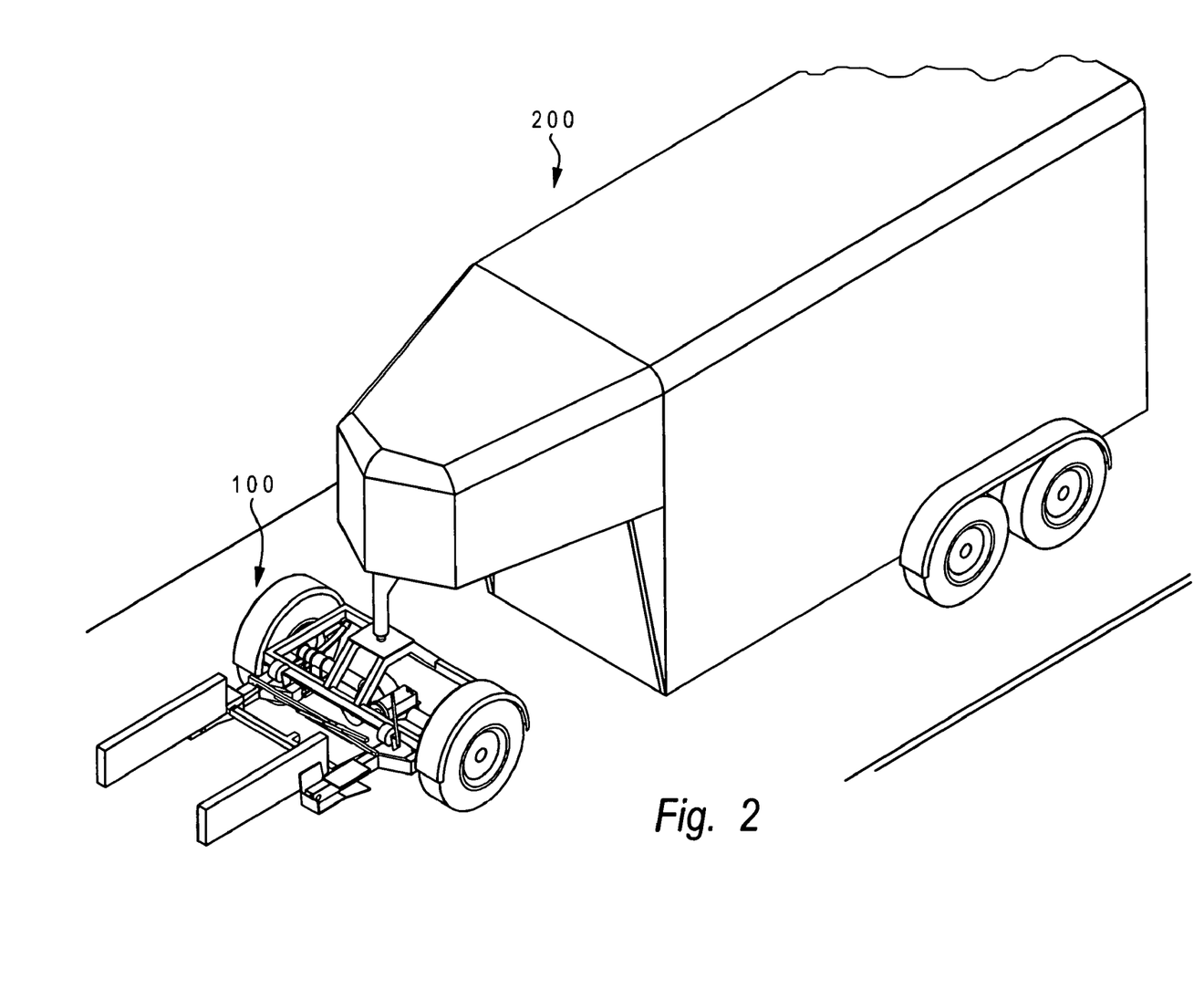
FIG. 2 is perspective view of the improved trailer towing system of the present invention.

As shown in FIG. 2, the improved trailer towing system of the present invention comprises an accessory towing apparatus 100 used to connect a towing vehicle and a gooseneck type trailer 200. When attached to a gooseneck type trailer 200, the accessory towing apparatus 100 becomes essentially integral with the gooseneck type trailer 200, so that, when detached from the towing vehicle the gooseneck type trailer 200 no longer needs jack stands to remain upright.

Figure 3A:
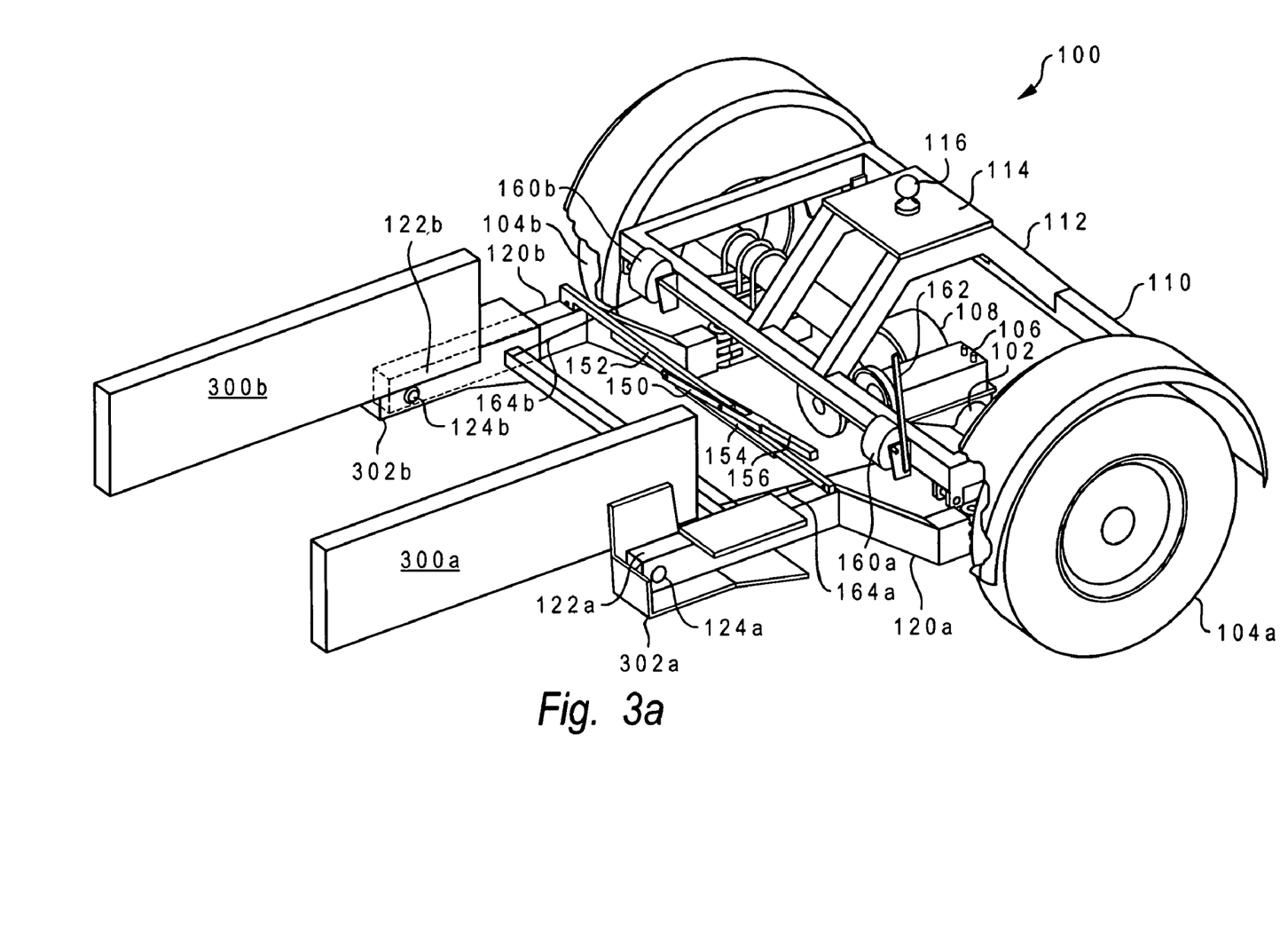
FIG. 3a is a perspective view of the accessory towing apparatus of the present invention.
Figure 3B:
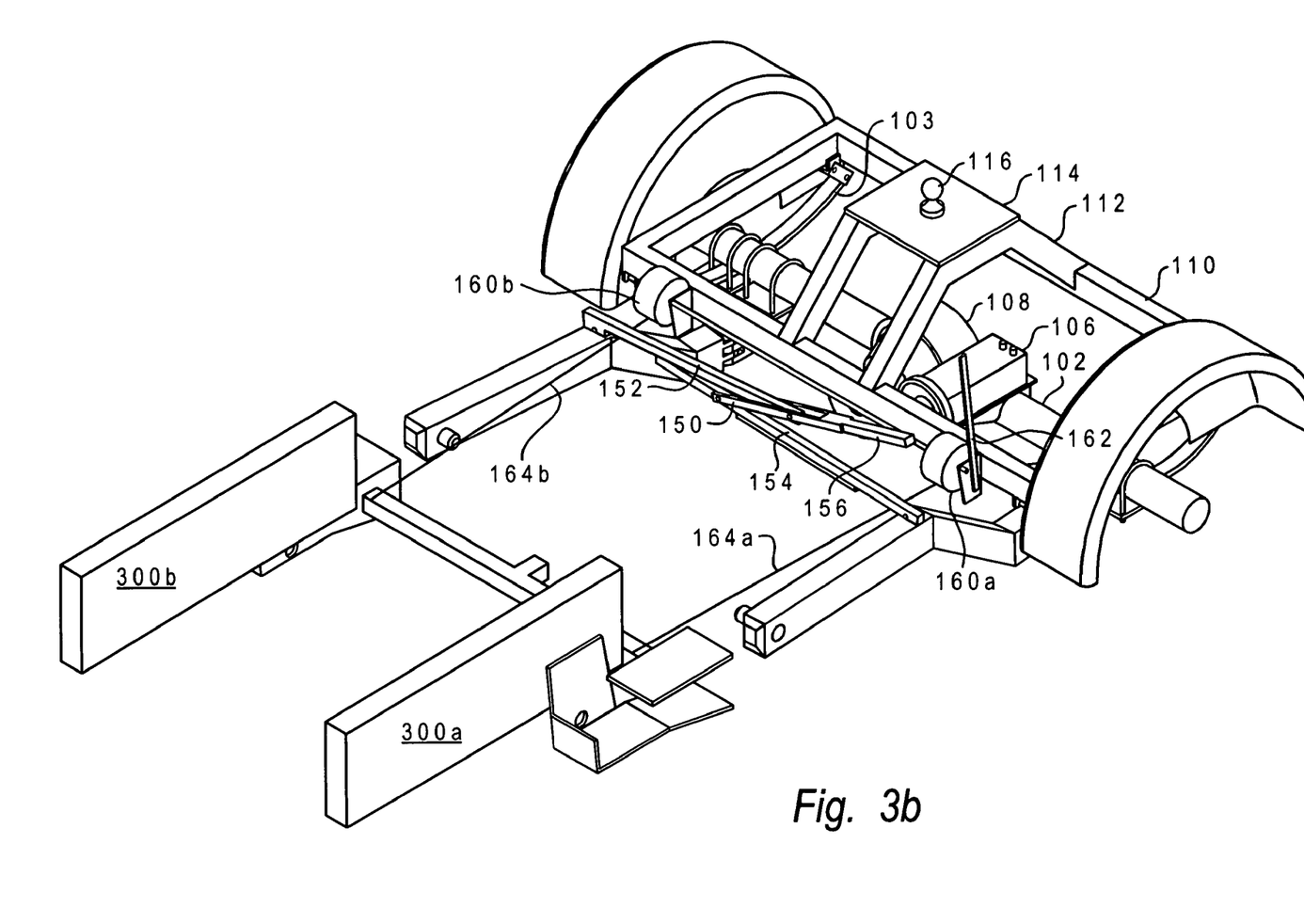
FIG. 3b is another perspective view of the accessory towing apparatus of the present invention disengaged from the towing vehicle and showing the hook up and clamping system in greater detail.
Figure 3C:
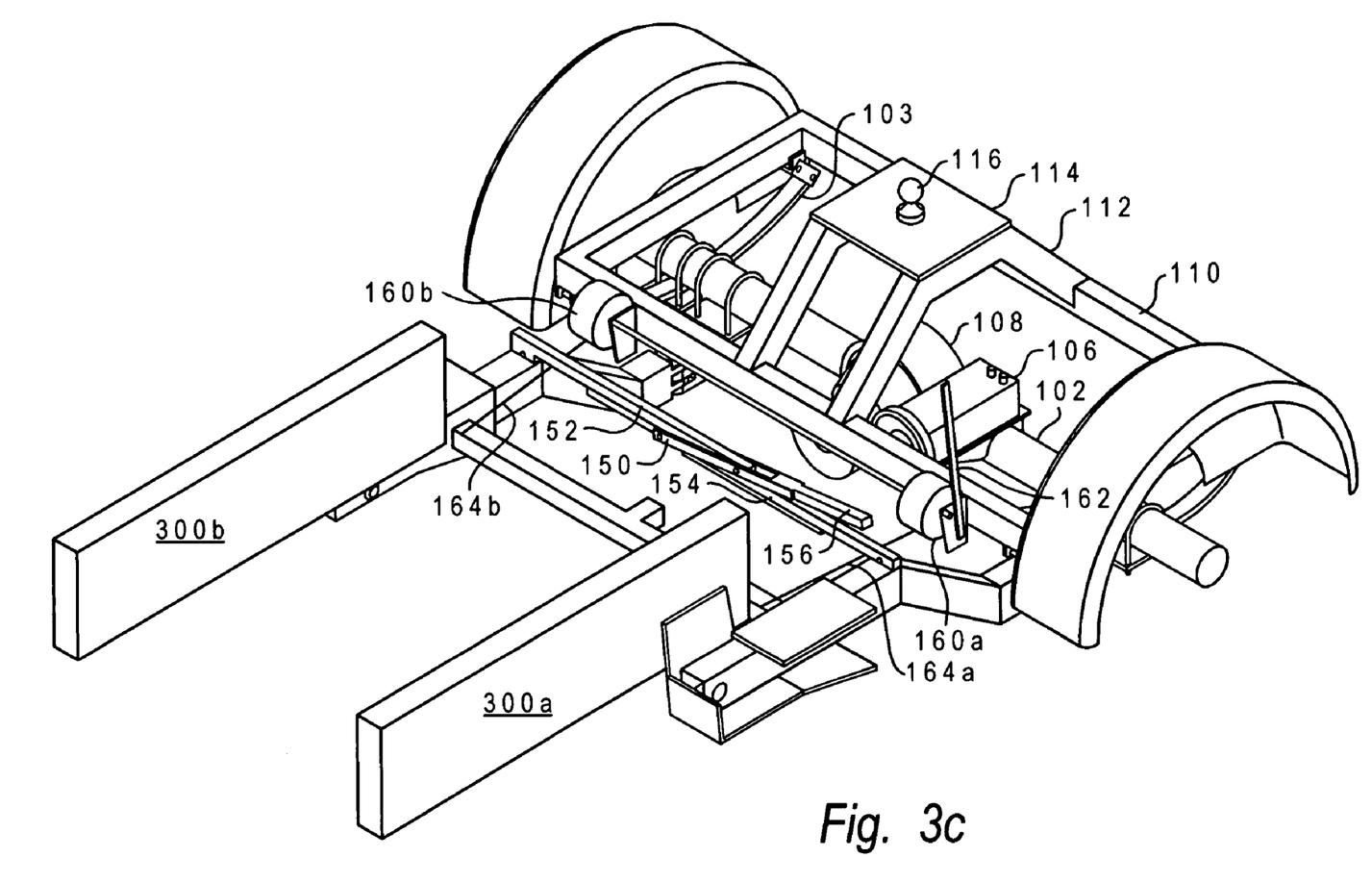
FIG. 3c is a perspective view of the accessory towing apparatus of the present invention shown in FIG. 3b locked and engaged with the towing vehicle.

As shown in the Figures and in greater detail in FIGS. 3a-3c, the accessory towing apparatus 100 includes a towing chassis assembly mounted on an axle assembly 102 having two ground engaging wheels attached thereto. The chassis assembly includes a main framework assembly 110 mounted over the axle assembly 102 and two linkage arms 120a, 120b attached to and extending from the axle assembly 102. In the embodiment shown, the main framework assembly 110 is mounted on springs 103a, 103b attached to the axle assembly 102. The main framework 110 includes a structure 112 which extends vertically to a planar surface 114 upon which is mounted a hitch mechanism 116. While a ball hitch mechanism 116 is shown in the illustrations, it is understood that a hitch mechanism 116 commonly known as a fifth-wheel hitch may also be used.

The distal ends 122a, 122b of the two linkage arms 120a, 120b are designed to selectively engage their respective brackets 302a, 302b, which are attached to the frame 300a, 300b of the towing vehicle. As shown in the Figures, the brackets 302a, 302b are fixably attached to the main frame structure 300a, 300b of the towing vehicle. In actual practice the brackets 302a, 302b may be fixably attached through welding or common fastener means such as nuts and bolts, or may be integral to the main frame structure 300a, 300b of the towing vehicle. It will be observed that when the two linkage arms 120a, 120b are engaged in their respective brackets, they are essentially parallel to one another. Moreover, it will further be observed that when the two linkage arms 120a, 120b are properly secured in their respective brackets, the axle assembly 102 is aligned substantially parallel with the traction axle of the towing vehicle. The accessory towing apparatus 100 rigidly maintains the axle assembly 102 in a substantially parallel alignment with the traction axle of the towing vehicle during all dynamic operationsm further enhancing the stability and control of the towing assembly.

Figure 4:
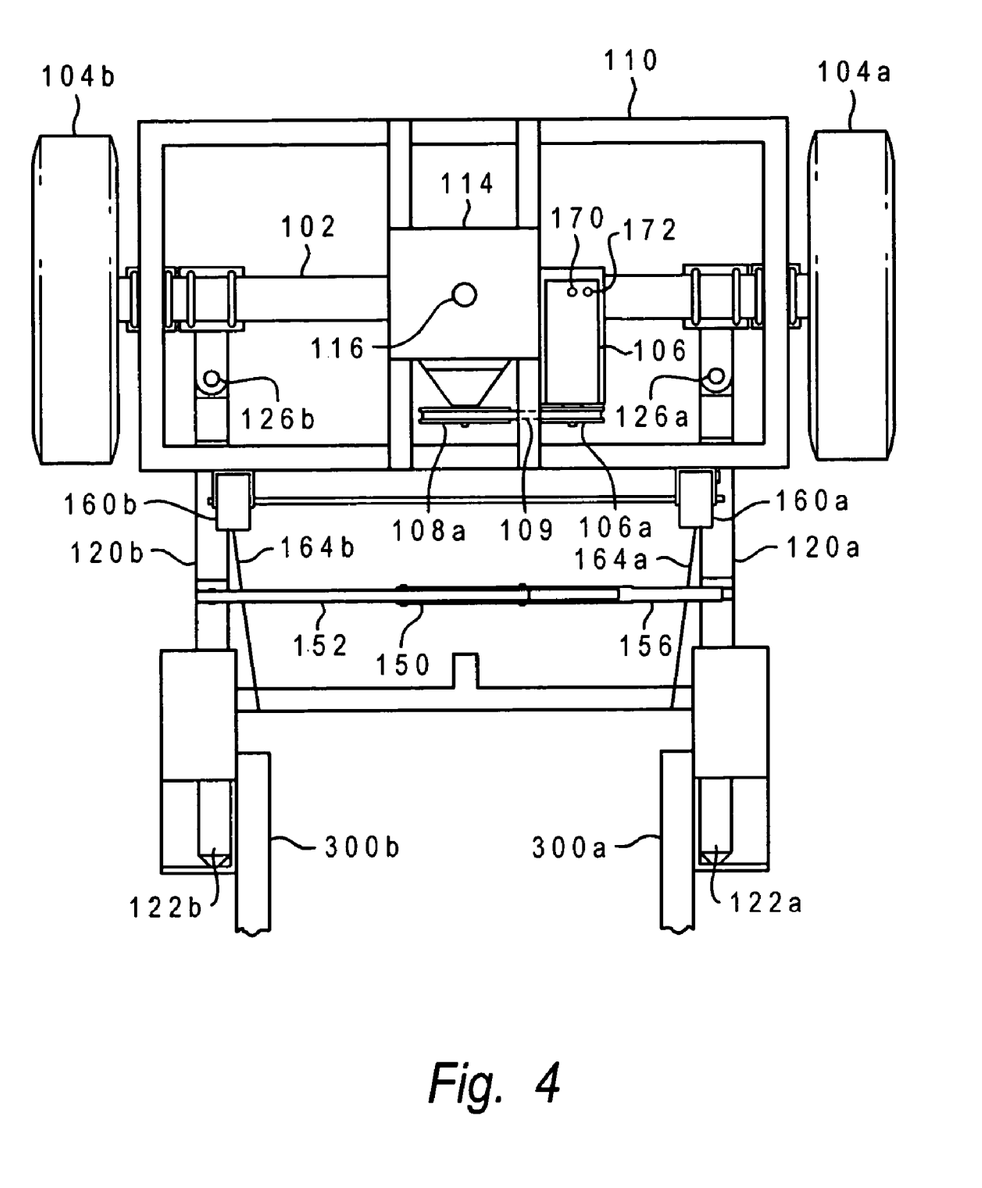
FIG. 4 is a overhead view of the accessory towing apparatus of the present invention.
Figure 5:
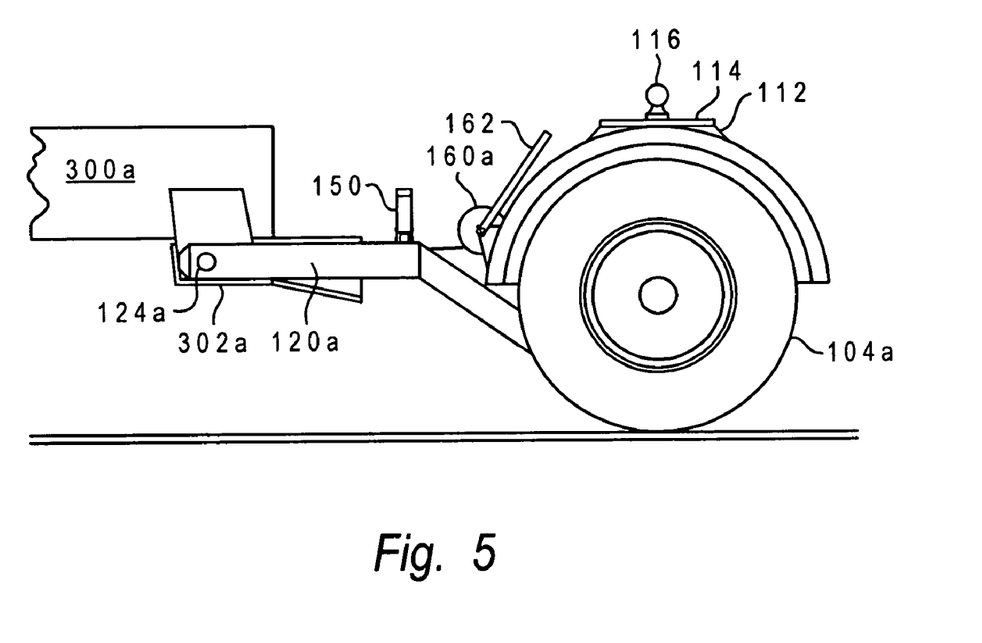
FIG. 5 is a side view of the accessory towing apparatus of the present invention.

As shown in FIG. 4, each of the two linkage arms 120a, 120b may further include pivot joints 126a, 126b which permit the two linkage arms to pivot away from one another so that the distal ends may spread apart to help engage or disengage the brackets 302a, 302b.

For example, as shown FIG. 3b, the two linkage arm 120a, 120b may be spread slightly prior to engaging brackets 302a, 302b thereby easing security pins 124a, 124b into their respective brackets 302a, 302b. As shown in FIG. 3c, once properly aligned in each of the their respective brackets, the linkage arms 120a, 120b may be pivoted towards each other causing the pins 124a, 124b to seat in holes 304a, 304b effectively locking each of the linkage arms in its respective bracket.

With reference now to FIGS. 3b-3c, a novel clamping lever system 150 is shown. The clamping lever system 150 is used to effectively secure the two linkage arms 120a, 120b into their respective brackets 302a, 302b. The clamping lever system 150 comprises two opposing cantilever arms 152, 154 and a lever arm 156 which connects the two cantilever arms 152, 154. The cantilever arms 152, 154 are each attached to a respective linkage arm 120a, 120b. The cantilever arms 152, 154 may be fixably or pivotally attached to its respective linkage arm. Moreover, it is understood that the relative position of the attachment points of the cantilever arms 152, 154 may be varied or adjusted along the length of the linkage arms 120a, 120b. As shown in FIGS. 3b-3c, the lever arm 156 is attached to the first and second cantilever arms 152, 154 so as to induce tension in each of the cantilever arms when the lever arm 156 is brought down upon the second cantilever arm 154. By inducing tension in each of the cantilever arms, the closing or locking of the clamping lever system 150 effectively causes the linkage arms 120a, 120b to pivot or move towards one another. Similarly, when the clamping lever system 150 is opened or unlocked, the lever arm 156 induces compression in the cantilever arms 152, 154 which effectively causes the linkage arms 120a, 120b to pivot or spread away from one another.

With reference to the Figures and in particular FIGS. 3a-3c, a novel alignment and attachment system is also illustrated. The alignment system comprises two lengths of cable or chain 164a, 164b each attached to a ratcheting winch mechanism 160a, 160b. The ratcheting winch mechanisms 160a, 160b are preferably self-contained and integral to the accessory towing apparatus 100 and may be powered and controlled mechanically, electrically, hydraulically or any combination thereof. The two chains or cables 164a, 164b are of equal length and adequately spaced apart, such that when the cables are attached to a tow vehicle the centerline of the trailer may be aligned with the centerline of the tow vehicle by simply driving the tow vehicle straight forward. The ratcheting winch mechanisms 160a, 160b may then be used to advance and guide the two linkage arms 120a, 120b into their respective brackets 302a, 302b. Moreover, when the trailer is positioned in a soggy area having poor traction, the towing vehicle can be positioned on solid footing and the alignment and attachment system may be used to pull and the trailer and accessory towing apparatus to the towing vehicle.

Another innovative aspect of the present invention comprises a power take off mechanism to power a hydraulic pump assembly, a vacuum pump assembly, and/or an accessory electrical generator. As shown in the Figures, in one embodiment the axle assembly includes a power take off mechanism 108 which includes a wheel assembly 108a that powers an accessory power mechanism 106 by means of a belt assembly 109 and wheel 106a. Input 170 and output 172 supply whatever form of power generated by the accessory power mechanism 106 to the appropriate accessory systems located on the accessory towing apparatus 100 and/or the attached trailer 200. In one embodiment, the accessory power mechanism 106 comprises a hydraulic pump assembly. In another embodiment, the accessory power mechanism 106 comprises an electrical generator. An independent hydraulic or vacuum pump assembly enables the accessory towing apparatus to provide hydraulic braking power to all trailer wheels that is independent of the towing vehicle's hydraulic system. In addition, an accessory hydraulic pump can be used to charge a hydraulic pressure accumulator (not shown) thereby providing a source of hydraulic power for a hydraulically powered ratcheting winch mechanism. Likewise, an electrical generator could enable the accessory towing apparatus to provide accessory electrical power to itself and the trailer that is independent of the towing vehicle's electrical system. Additionally, an accessory electrical generator could charge an accessory battery (not shown) on the accessory towing apparatus.

It will now be evident to those skilled in the art that there has been described herein an improved trailer towing system for towing gooseneck type trailers, which enhances the utility, stability and safety of the hitched vehicle and trailer.

Although the invention hereof has been described by way of a preferred embodiment, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

The invention claimed is:

1. An accessory towing apparatus for linking a vehicle and a gooseneck trailer, comprising in combination:
    an axle assembly having a plurality of ground engaging wheels disposed thereon;
    a first and second linkage arms attached to and extending from said axle assembly, said linkage arms each comprising a pivot joint which allows the linkage arm to selectively pivot out of parallel with the other linkage arm, and
    a main framework attached to said axle assembly, said framework having a hitch mechanism mounted thereon, wherein said linkage arms are operable for connecting to complementary brackets attached to said vehicle.

2. The towing apparatus of claim 1 wherein said linkage arms are substantially parallel to each other when connected to said complementary brackets.

3. The towing apparatus of claim 1 further comprising a clamping lever system for securing said linkage arms to said complementary brackets.

4. The towing apparatus of claim 3 wherein said clamping lever system comprises a first cantilever arm attached said first linkage arm, a second cantilever arm attached to said second linkage arm, and a lever arm pivotally attached to said first and second cantilever arms.

5. The towing apparatus of claim 4 wherein said cantilever arms are pivotally attached to said linkage arms.

6. The towing apparatus of claim 4 wherein said cantilever arms are fixably attached to said linkage arms.

7. The towing apparatus of claim 1 further comprising an integral winch mechanism.

8. The towing apparatus of claim 7 wherein said winch mechanism is a mechanical ratcheting mechanism.

9. The towing apparatus of claim 7 wherein said winch mechanism is an electrical ratcheting mechanism.

10. The towing apparatus of claim 7 wherein said winch mechanism is a hydraulic ratcheting mechanism.

11. The towing apparatus of claim 1 wherein said axle assembly further comprises a power take off mechanism connected to an accessory power mechanism.

12. The towing apparatus of claim 11 wherein said accessory power mechanism is a hydraulic pump.

13. The towing apparatus of claim 11 wherein said accessory power mechanism is an electrical generator.

14. The towing apparatus of claim 11 wherein said accessory power mechanism is a vacuum pump.

15. An accessory towing apparatus for linking a vehicle and a gooseneck trailer, comprising in combination:

an axle assembly having a plurality of ground engaging wheels disposed thereon;

a first and second linkage arms attached to and extending from said axle assembly wherein said linkage arms are operable for connecting to complementary brackets attached to said vehicle, a clamping lever system for securing said linkage arms to said complementary brackets, and a main framework attached to said axle assembly, said framework having a hitch mechanism mounted thereon, wherein said clamping lever system comprises a first cantilever arm attached said first linkage arm, a second cantilever arm attached to said second linkage arm, and a lever arm pivotally attached to said first and second cantilever arms.

16. The towing apparatus of claim 15 wherein said linkage arms are substantially parallel to each other.

17. The towing apparatus of claim 16 wherein each of said linkage arms further comprise a pivot joint which allows the linkage arm to selectively pivot out of parallel with the other linkage arm.

18. The towing apparatus of claim 15 wherein said cantilever arms are pivotally attached to said linkage arms.

19. The towing apparatus of claim 15 wherein said cantilever arms are fixably attached to said linkage arms.

20. The towing apparatus of claim 15 wherein said axle assembly further comprises a power take off mechanism connected to an accessory power mechanism.

* * * * *